United States Patent
Arya et al.

(10) Patent No.: US 9,313,532 B1
(45) Date of Patent: Apr. 12, 2016

(54) METHOD AND SYSTEM FOR SECURELY PERFORMING CALLBACKS IN A CONTENT DISTRIBUTION SYSTEM

(71) Applicant: The DIRECTV Group, Inc., El Segundo, CA (US)

(72) Inventors: Vishal Arya, Manhattan Beach, CA (US); Ronald J. Hubach, Riverside, CA (US); Ivonne Y. Chen, Torrance, CA (US); Vaibhav Singh, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 224 days.

(21) Appl. No.: 14/044,399

(22) Filed: Oct. 2, 2013

(51) Int. Cl.
*H04N 21/2543* (2011.01)

(52) U.S. Cl.
CPC ................................ *H04N 21/2543* (2013.01)

(58) Field of Classification Search
CPC .............. G06Q 30/06; H04N 21/6371; H04N 7/17318; H04L 12/2856
USPC .............. 709/203; 386/92; 725/1, 31, 61, 104
See application file for complete search history.

(56) References Cited

U.S. PATENT DOCUMENTS

| 2005/0114442 | A1* | 5/2005 | Hardwick et al. ............. 709/203 |
| 2008/0285945 | A1* | 11/2008 | Rajakarunanayake et al. . 386/92 |
| 2010/0031281 | A1* | 2/2010 | Kim et al. ......................... 725/1 |

* cited by examiner

*Primary Examiner* — Brandon Hoffman
*Assistant Examiner* — Nega Woldemariam

(57) ABSTRACT

A system for securely communicating callback signals to a head end includes a callback server and a user device communicating a request to open a callback session to the callback server. The callback server opens a first session between the callback server and a user device. The user device communicates an encrypted callback data signal to the callback server through the first session. The callback server opens a second session between the callback sever and a conditional access system associated with a head end, verifies the callback data signal at callback server, and communicates the encrypted callback data signal to the conditional access system through the second session. The conditional access system decrypts the encrypted callback data signal to form decrypted callback data.

23 Claims, 4 Drawing Sheets

METHOD AND SYSTEM FOR SECURELY PERFORMING CALLBACKS IN A CONTENT DISTRIBUTION SYSTEM

TECHNICAL FIELD

The present disclosure relates to a content communication system and, more specifically, to a system and method for performing callbacks from a user device to a head end or content processing system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

A callback is communicated from the set top box to the billing system to keep track of purchases. One way a satellite television system provides callbacks is to use a telephone modem to communication to a head end. Providing a telephone connection over a modem costs a relatively large amount of money since a telecommunication provider must be compensated for each call. The telephone connection also takes a relatively large amount of time.

A callback is also used to communicate other types of data to the head end including preferences, playback data such as a last position, favorites, and use data. An efficient means for communicating callbacks to a head end is important.

SUMMARY

The present disclosure by a method and system for communicating callbacks through a callback server module securely.

In one aspect of the disclosure, a method includes generating a request to open a callback session at a user device, communicating the request to open the callback session to a callback server, opening a first session between the callback sever and a user device, communicating an encrypted callback data signal from the user device to the callback server through the first session, opening a second session between the callback sever and a conditional access system associated with a head end, verifying the callback data signal at callback server, communicating the encrypted callback data signal to the conditional access system through the second session and decrypting the encrypted callback data signal at the conditional access system to form decrypted callback data.

In a further aspect of the disclosure, a system includes a callback server and a user device communicating a request to open a callback session to the callback server. The callback server opens a first session between the callback server and a user device. The user device communicates an encrypted callback data signal to the callback server through the first session. The callback server opens a second session between the callback sever and a conditional access system associated with a head end, verifies the callback data signal at callback server, and communicates the encrypted callback data signal to the conditional access system through the second session. The conditional access system decrypts the encrypted callback data signal to form decrypted callback data.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
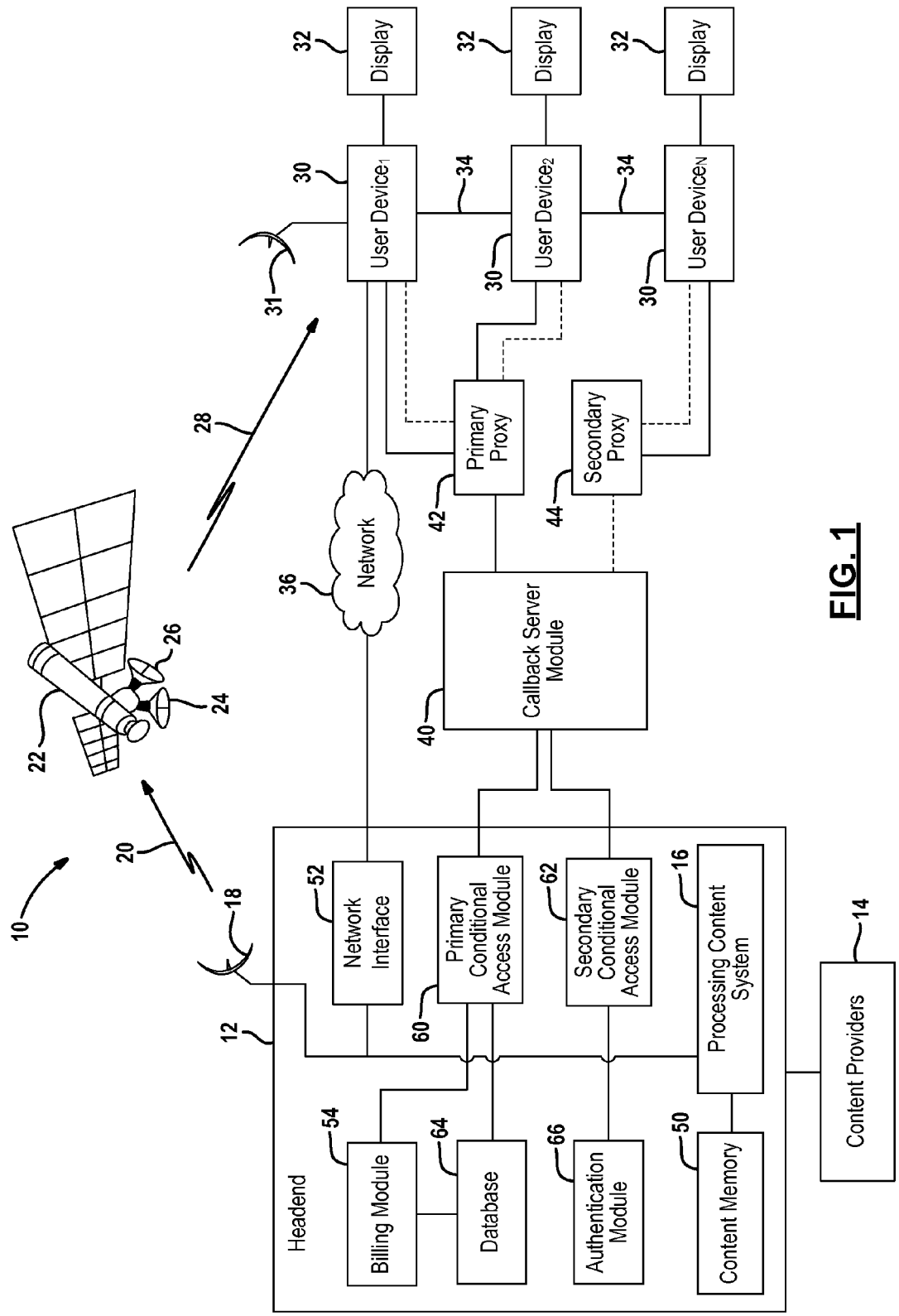
FIG. 1 is a block diagrammatic view of the communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receives/decoders (IRDs) as described below can be reallocated as desired without departing from the intended scope of the present patent.

Referring now to FIG. 1, a communication system 10 is illustrated. Communication system 10 includes a head end 12 that is used as a content processing system and a transmission source. The head end 12 may also be used for distributing content and providing billing data.

Content providers 14, only one of which is illustrated, may provide content and data related to the content such as metadata to the head end. The head end 12 receives various types of data and content from the content provider and communicates the content to various user devices associated with the system.

The head end 12 may communicate content to users in various manners including a satellite system and through terrestrial networks. The content providers 14 provide content to a content processing system 16 within the head end 12. The content processing system 16 prepares the content for distribution through the satellite system or the terrestrial network. This may include properly formatting the content.

In the satellite example, the head end 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices 30.

The user devices 30 may include a receiving antenna 31 for receiving the downlink signals. The user device 30 may be referred to as a set top box. Each user device 30 includes a display 32 associated therewith. The display 32 is illustrated as a separate device, however, display 32 may be integrated with the user device 30 such as in a cellular phone or other type of mobile device. It is also possible for the user device 30 to be interconnected through a local area network 34. Thus the user devices 30 illustrated in FIG. 1 may represent one household or a plurality of households.

The head end 12 may be connected to each of the user devices 30 through a network 36. As illustrated, only one network connection 36 is illustrated. The network 36 may be used to provide content from the content processing system 16 of the head end 12. The satellite system, the terrestrial network 36 or the combination of both may be used to provide content and data to the user device 30.

A callback server module 40 may be disposed between the user device 30 and the head end 12. The callback server module 40 may also use the network 36 for communication. The callback server module 40 may have proxies associated therewith. In this example, a primary proxy 42 and a secondary proxy 44 may be used to communicate between the callback server module and the user devices 30. Although, both a primary proxy 42 and a secondary proxy 44 are illustrated, no proxy, one proxy or both proxies may be used in the intercommunication between the user device 30 and the callback server module 40.

The head end 12 may include a content memory 50 that is used for storing various content received from the content providers 14. The content processing system 16 may interface with the content memory 50 for distributing the content through the satellite uplink antenna 18 or through a network interface 52 through the network 36.

A billing module 54 may also be incorporated into the head end 12. The billing module 54 may be used for associating one or more user profiles with a user account. Encryption/decryption keys may also be associated with an account. Different profiles may also be assigned to different devices within an account. For example, an account may be associated with fixed devices such as set top box at a home as well as various mobile devices. The billing module 54 may also keep track of subscription that each user is subscribed to, as well as pay-per-view and on-demand purchases.

Purchase data and other callback data is received in callback data received at the primary conditional access module 60 and/or the secondary conditional access module 62. The database 64 stores the callback data therein. The operation of the primary conditional access module 60 and the secondary conditional access module 62 will be described in detail below. The head end 12 may also include an authentication module 64. The authentication module 64 may be used to authenticate or authorize communications between the callback server module 40 and the user device 30. The primary conditional access module 60 and the secondary conditional access module 62 may receive callback data that requires authentication or decryption using the authentication module 66. The authentication module 66 may require a decryption key, password or other methods for authorization. The primary conditional access module 60 and the secondary conditional access module 62 may also communicate authorizations through the network 36 or the satellite 22 to the user device in response to a purchase request. These actions will be described in more detail below.

A timer module 116 may also be included in the callback server 40. The timer module 116 is used for comparing the received time stamp with a current time and determining if the received time is within a predetermined time window. One example of a predetermined time window is plus or minus five minutes.

Figure 2:
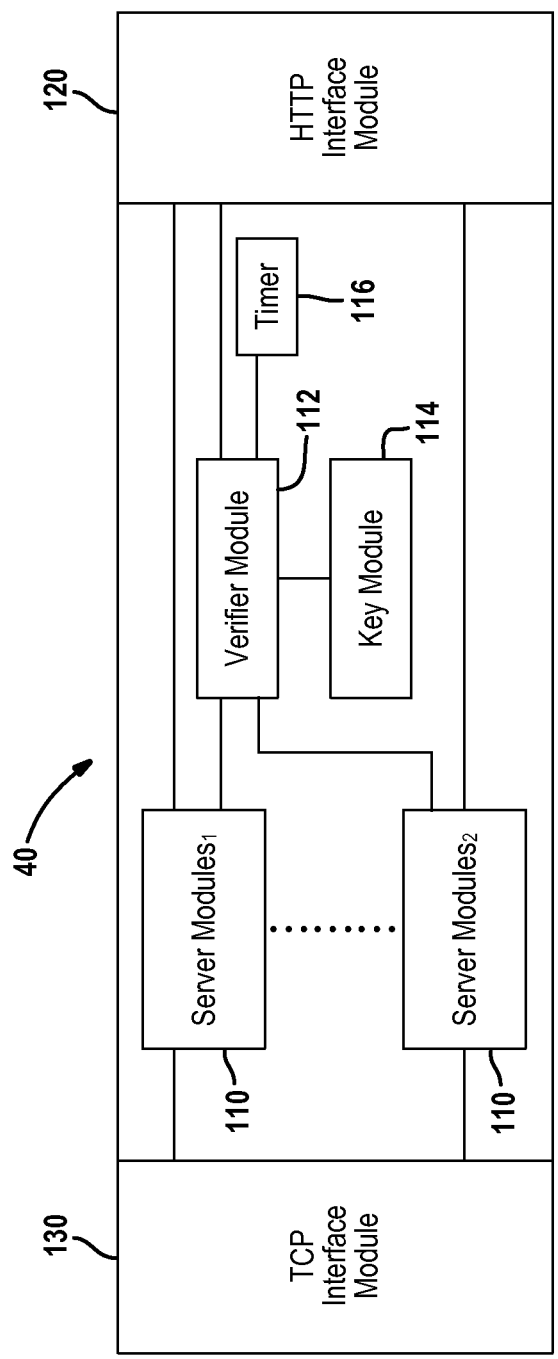
FIG. 2 is a high level block diagrammatic view of the callback server module of FIG. 1.

Referring now to FIG. 2, further details of the callback server module 40 are illustrated. The callback server module 40 may include a plurality of server modules 110 therein. The number of server modules 110 may vary depending upon various factors including the server capabilities, the system requirements and the amount of user devices within the system. The callback server module 40 may also include a verifier module 112. The verifier module 112 may be used to verify the communication from the various user devices 30 illustrated in FIG. 1. The verifier module 112 may be associated with a key module 114. A key stored within the key module 114 may be used to obtain signature and time stamp from the communications from the user devices 30. This process will be described in detail below. Once verified, the callback data (which may be encrypted as received from the user device) is communicated to the head end 12.

The server modules 110 are in communication with a hypertext transfer protocol interface module 120. The HTTP interface module 120 is used to interface with the user devices 30 and possibly through the proxies 42, 44 illustrated in FIG. 1. The HTTP session may be referred to as a first session and may be secure.

The server modules 110 may also be in communication with a transmission control protocol interface module 130. The transmission control protocol (TCP) interface module 130 communicates with the primary conditional access module 60 and the secondary conditional access module 62 of the head end 12 illustrated in FIG. 1. The TCP session may be an unsecure session.

Figure 3:
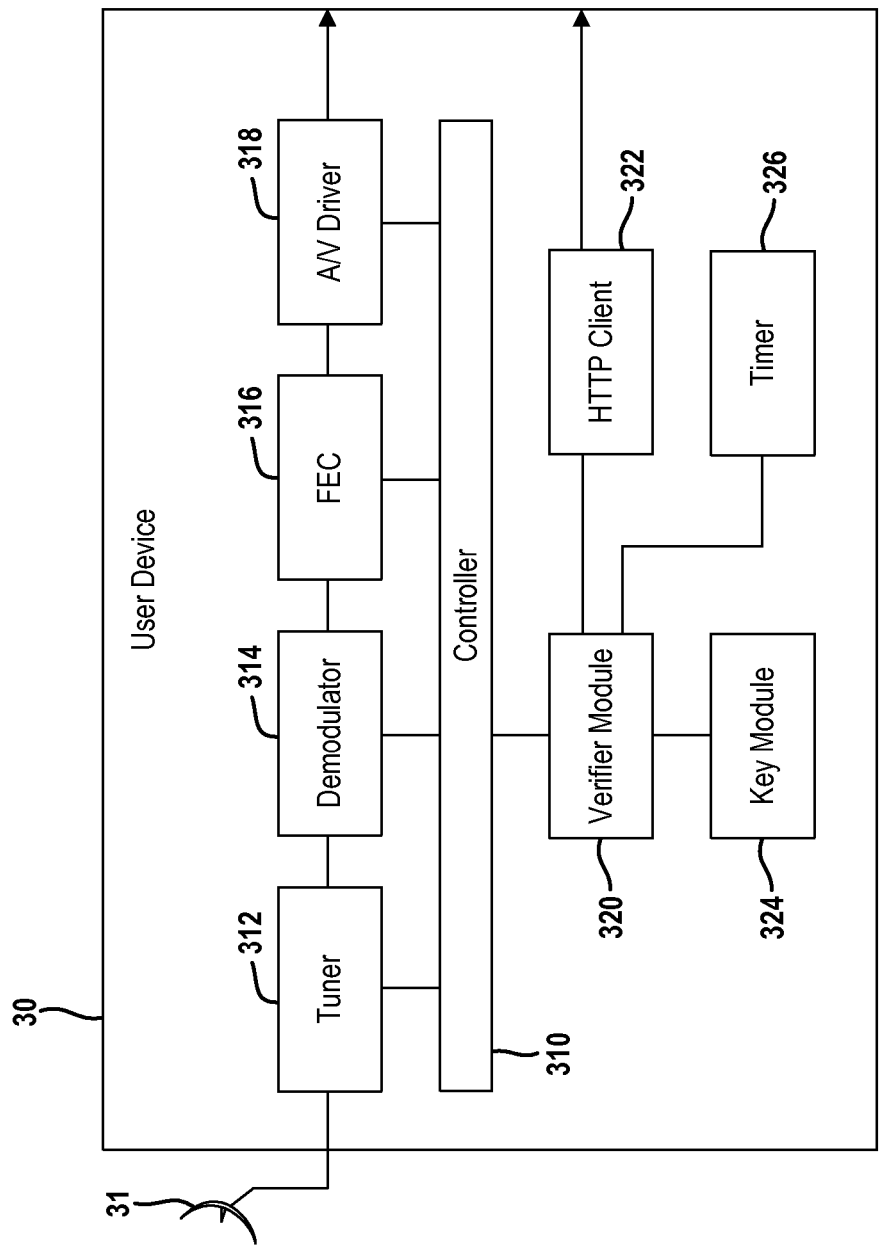
FIG. 3 is a block diagrammatic view of the user device of FIG. 1.

Referring now to FIG. 3, the user device 30 of FIG. 1 is illustrated in further detail. Although a particular example using the set top box is illustrated, it is merely representative of various electronic devices with an internal controller used as a content receiving device. The antenna 31 may be one of a number of different types of antennas that may include one or more low noise blocks associated therewith.

A controller 310 may be a general processor such as a microprocessor that cooperates with control software. The controller 310 may be used to coordinate control various functions of the user device 30. The functions may include the operation of a tuner 312, the operation of a demodulator 314, the operation of a forward error correction (FEC) decoder 316 and an audio video driver 318. Although only one tuner 312, demodulator 314, FEC decoder 316 and one audio video driver 318 are illustrated, multiple components or groups of components may be supported. The controller 310 may also be associated with a verifier module 320. The verifier module 320 is in communication with an HTTP client 322 that communicates with the callback server module 40 and the primary proxy 42 and secondary proxy 44 illustrated in FIG. 1. The verifier module 320 may generate an encrypted signal using a key stored within the key module 324. The verifier module 320 may also be used to sign the callback signal with a key and insert a time stamp therein.

A timer 326 may also be in communication with the verifier module 320. The timer may be used to generate a time stamp that is provided in the callback signal and requests to the callback server through the HTTP client 322.

The verifier module 320 may sign the communication with a key. The key may use various types of algorithms including the message digest five algorithm (MD-5), alone or in combination with a secure hash algorithm such as SHA-0, SHA-1, SHA-2, SHA-3 or Bcrypt. Various sub-variants may be associated with each of the secure hash algorithms. Of course, various algorithms may be used to perform the key signature.

In the case of the callback server module 40, illustrated in FIG. 2 and the user device 30 illustrated in FIG. 3, the key modules 114 and 324, respectively, may store a key or keys therein. However, a remote server (not illustrated) may be used to provide the key to the user device 30 and the callback server module 40.

Figure 4:
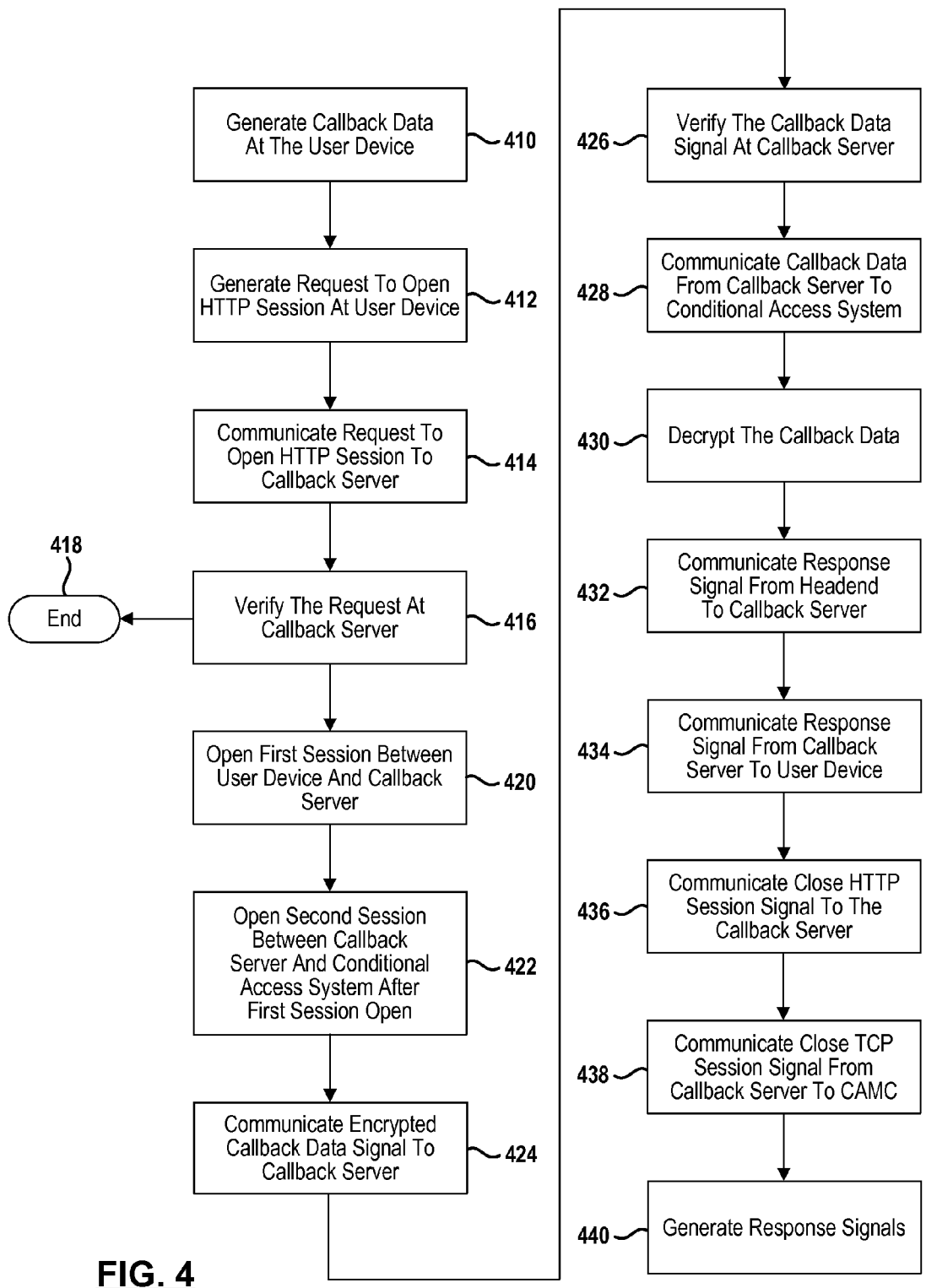
FIG. 4 is a flowchart of a method for operating the communication system.

Referring now to FIG. 4, a method for communicating callback signals is set forth. In step 410 callback data is generated at the user device. As mentioned above, various types of callback data may be generated including pay-per-view, on-demand purchase requests, and other types of data. A request to open a secure session is generated at the user device in step 412. The protocol for communicating between the user device and the callback server may be hypertext transfer protocol and thus a secure HTTP session may be generated. To generate the request a port may also be opened at the user device. The request may also be signed with the key described above using various algorithms. As mentioned above, the key may be stored within the set top box or may be requested prior to generating a request to open the HTTP session. The request to open the HTTP session may also be time stamped. In step 414 the request to open the HTTP session is communicated to the callback server. As mentioned above, the key may be used to sign the request as welt as the time stamp.

In step 416, the request is verified at the callback server. The request may be verified by decrypting the request using a key located at the callback server. Further, the request may not be verified if the time stamp included with the request is outside of a "current time." A predetermined time window may set from a current time plus or minus five minutes. Thus, verification at the callback server may verify the signature of the HTTP request, may verify the time window and may verify that multiple connection attempts from the same IP address in a short period of time are not performed. If the request is not verified, the process ends in step 418.

If the process is verified in step 416 then step 420 opens a first session between the user device and the callback server. A session cookie may be communicated to the user device to be used in subsequent HTTP communications. It should be noted that the request and the data may all be routed through one of the primary or secondary proxy servers. The primary and/or secondary proxy servers may be used for load balancing to the servers of the callback server module. After verification of the request to open the HTTP session, step 420 opens the session between the user device and the callback server.

In step 422 a back-end or second session may be requested between the callback server and at least one of the conditional access modules 60, 62 illustrated in FIG. 1. It should be noted that it is not until the first session is opened between the user device and the callback server that the second session between the callback server and the conditional access system is open. The first and second sessions may be in an open state simultaneously after they are both initially opened.

In step 424 encrypted callback data or an encrypted callback data signal is communicated to the callback server from the user device. Once again, this signal uses a key which signs the callback data signal and a time stamp. The session cookie may also be included. The encrypted callback data signal is verified at the callback server in step 426. Again, verification may be similar to that of the request to open the first session in that the key may be used to sign the request using various types of algorithms, the session cookie may be verified, a time stamp may be verified to determine whether it is within a predetermined time window and whether multiple attempts from the same IP address have been attempted within a time period. Once the signal is verified at the callback server, the callback server communicates the encrypted callback data from the callback server to the conditional access system in step 428. Data packets may be received from the user device in HTTP post and are forwarded after the verification described above.

In step 430 the conditional access system decrypts the callback data and communicates the data to the billing system or for storage into the database.

It should be noted that a response signal having response data may be communicated from the head end to the callback server in step 432. The response signal is an optional step for communicating data to the user device. The respond signal may then be communicated from the callback server to the user device in step 434. The user device processes the response data for use of performs the instruction.

In step 436 a close session signal may be communicated from the set top box to the callback server. A corresponding close session signal may be communicated from the callback server to the conditional access module of the head end in step 438. The close session signal of step 436 closes the HTTP session and the close session signal of step 438 closes the TCP signal. A response signal from the conditional access system to the callback server and from the callback server to the user device may also be generated in response to the closed session signals in step 440. It should be noted that steps 432 through steps 440 may be optional steps.

It should be noted that the initiation of the callback is generated from the set top box. Although data may be communicated from the conditional access system or the head end to the set top box it may only be performed after the sessions are opened as described above.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
generating a request to open a callback session at a user device; communicating the request to open the callback session to a callback server; opening a first session between the callback server and a user device;
communicating an encrypted callback data signal from the user device to the callback server through the first session;
opening a second session between the callback server and a conditional access system associated with a head end;
verifying the encrypted callback data signal at callback server;
communicating the encrypted callback data signal to the conditional access system through the second session;
wherein communicating the request to open the callback session to the callback server comprises communicating the request to open the callback session to a proxy server associated with the callback server;
and decrypting the encrypted callback data signal at the conditional access system to form decrypted callback data.

2. The method as recited in claim 1 wherein generating the request comprises generating the request signed with a key to form a signature and wherein verifying comprises verifying the signature.

3. The method as recited in claim 1 wherein generating the request comprises generating the request signed with a key to form a signature and comprising a time stamp and wherein verifying comprises verifying the signature and verifying the time stamp.

4. The method as recited in claim 3 wherein verifying the time stamp comprises verifying the time stamp is within a predetermined time window.

5. The method as recited in claim 1 wherein opening the second session comprises opening the second session after opening the first session.

6. The method as recited in claim 1 wherein after generating the request, opening a secure channel between the user device and the callback server.

7. The method as recited in claim 6 wherein opening a secure channel comprises opening a secure hypertext transfer protocol session.

8. The method as recited in claim 1 wherein opening the second session comprises opening the second session using an unsecure session.

9. The method as recited in claim 1 wherein opening the second session comprises opening the second session using transmission control protocol.

10. The method as recited in claim 1 further comprising generating a response signal at the head end;
communicating the response signal from the head end to the callback server through the second session; and
communicating the response signal from the callback server to the user device through the first session.

11. The method as recited in claim 1 further comprising generating a close session signal at the user device;
communicating the close session signal to the callback server;
closing the first session in response to the close session signal.

12. The method as recited in claim 1 further comprising storing the decrypted callback data in a database of the head end.

13. A system comprising: a callback server;
and a user device communicating a request to open a callback session to the callback server; said callback server opening a first session between the callback server and the user device;
a proxy server communicating between the user device and the callback server;
said user device communicating an encrypted callback data signal to the callback server through the first session;
said callback server opening a second session between the callback sever and a conditional access system associated with a head end, verifying the encrypted callback data signal at callback server, and communicating the encrypted callback data signal to the conditional access system through the second session;
said conditional access system decrypting the encrypted callback data signal to form decrypted callback data.

14. The system as recited in claim 13 wherein the request is signed with a key to form a signature and wherein the callback server verifies the signature.

15. The system as recited in claim 12 wherein the request is signed with a key to form a signature and comprises a time stamp and wherein the callback server verifies the signature and the time stamp.

16. The system as recited in claim 15 wherein the callback server verifies the time stamp is within a predetermined time window.

17. The system as recited in claim 13 wherein the first session comprises a secure channel.

18. The system as recited in claim 17 wherein the secure channel comprises a secure hypertext transfer protocol session.

19. The system as recited in claim 13 wherein the second session comprises an unsecure session.

20. The system as recited in claim 19 wherein the second session comprises uses a transmission control protocol.

21. The system as recited in claim 13 wherein the head end communicates a response signal to the callback server through the second session and wherein the callback server communicates the response signal to the user device through the first session.

22. The system as recited in claim 13 wherein the user device communicates a close session signal to the callback server and closes the first session in response to the close session signal.

23. The system as recited in claim 13 further comprising further comprising a database within the head end storing the decrypted callback data.

* * * * *